W. BAUSCH.
PHOTOGRAPHIC FILM FEEDING DEVICE.
APPLICATION FILED SEPT. 15, 1916.
1,258,387.
Patented Mar. 5, 1918.
2 SHEETS—SHEET 1.
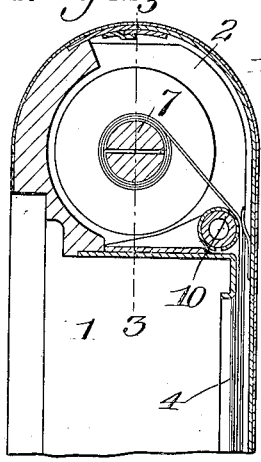
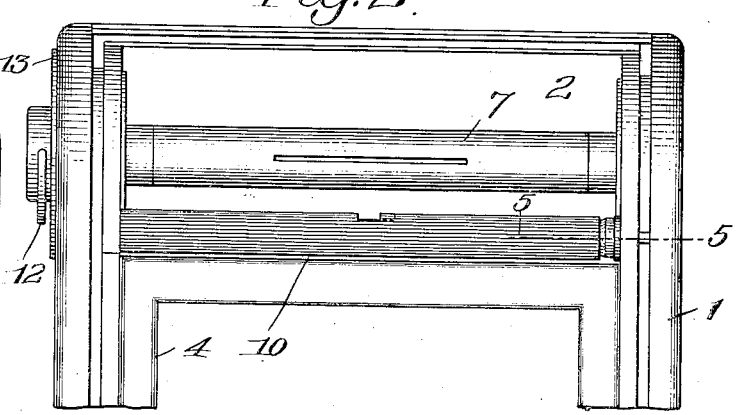
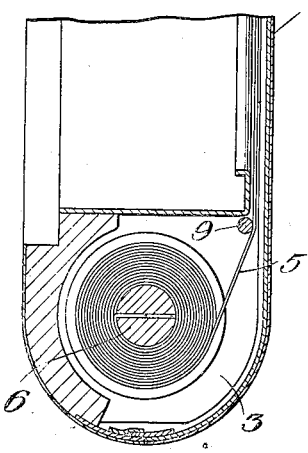
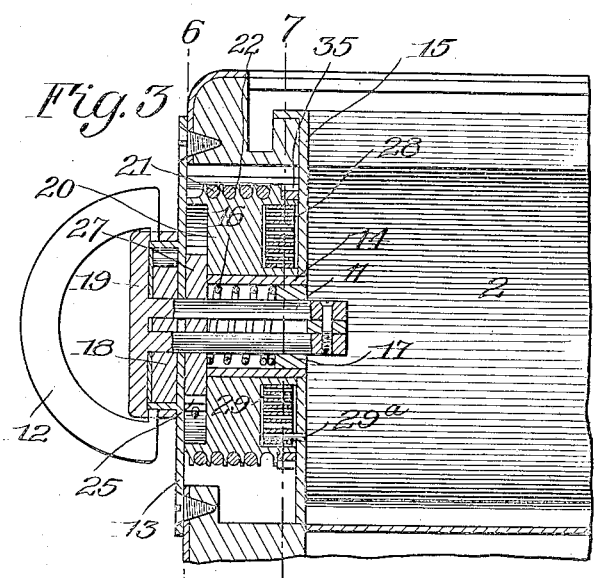
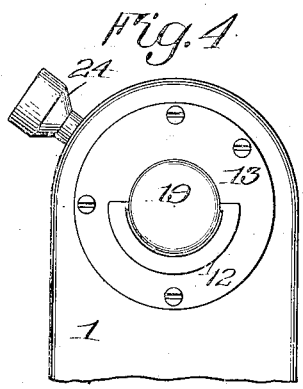
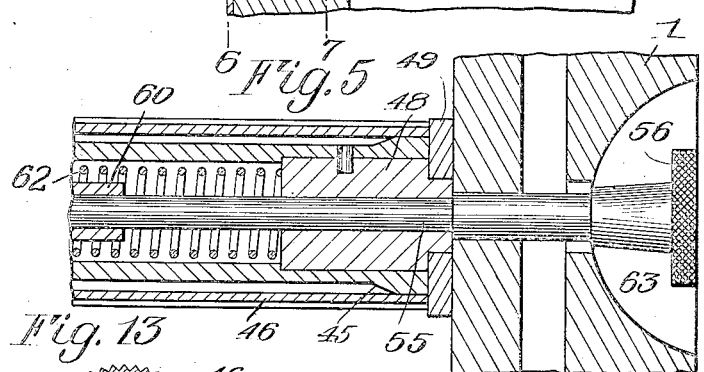
WITNESSES:
INVENTOR
William Bausch
BY
his ATTORNEYS W. BAUSCH.
PHOTOGRAPHIC FILM FEEDING DEVICE.
APPLICATION FILED SEPT. 15, 1916.
1,258,387.
Patented Mar. 5, 1918.
2 SHEETS—SHEET 2.
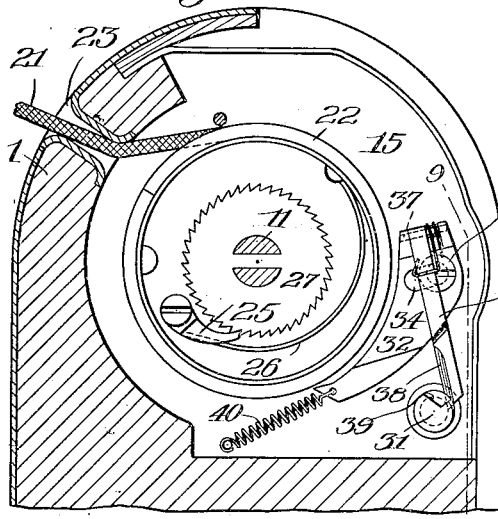
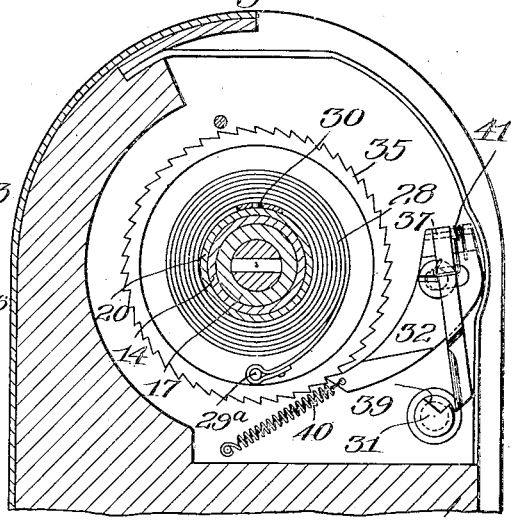
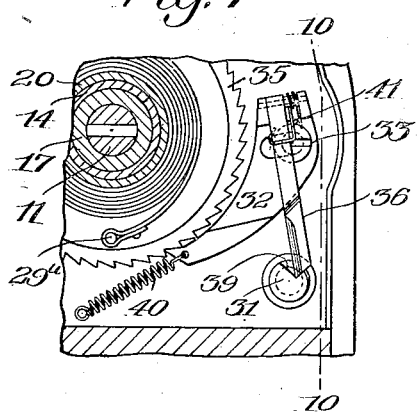
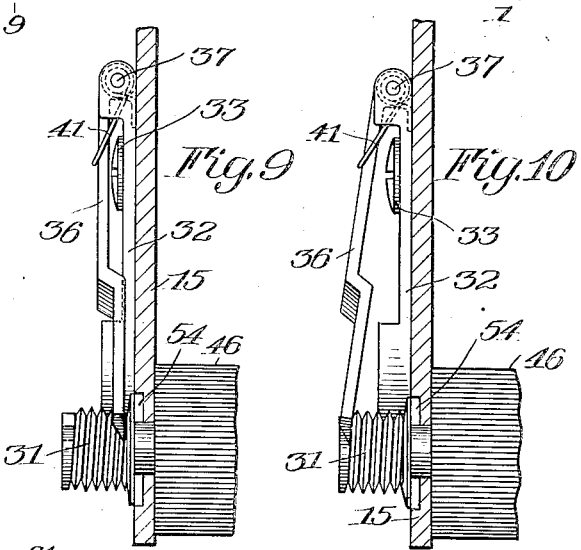
WITNESSES:
INVENTOR
William Bausch
BY
his ATTORNEYS

UNITED STATES PATENT OFFICE.

WILLIAM BAUSCH, OF ROCHESTER, NEW YORK.

PHOTOGRAPHIC-FILM-FEEDING DEVICE.

1,258,387.     Specification of Letters Patent.     Patented Mar. 5, 1918.

Application filed September 15, 1916. Serial No. 120,251.

*To all whom it may concern:*

Be it known that I, WILLIAM BAUSCH, of Rochester, in the county of Monroe and State of New York, have invented certain new and useful Improvements in Photographic-Film-Feeding Devices; and I do hereby declare the following to be a full, clear, and exact description of the same, reference being had to the accompanying drawings, forming a part of this specification, and to the reference-numerals marked thereon.

My present invention relates to photography and more particularly to photographic cameras of the roll film type and it has for its object to provide in a camera or roll holder a simple, convenient and efficient means for quickly feeding into the field of exposure the exact length of film required for the taking of one picture. The improvements are directed in part toward rendering such a device compact and toward providing means whereby an automatic lock for halting the film after a predetermined length has been fed can be independently regulated to conform to the position of the film after the latter has been started through the camera or roll holder. To these and other ends the invention resides in certain improvements and combinations of parts all as will be hereinafter more fully described, the novel features being pointed out in the claims at the end of the specification.

In the drawings:

Figure 1 is a longitudinal central section through a folding roll film camera having film winding mechanism constructed in accordance with and illustrating one embodiment of my invention;

Fig. 2 is a rear elevation of the film winding end of the camera;

Fig. 3 is an enlarged fragmentary section on the line 3—3 of Fig. 1;

Fig. 4 is a fragmentary side elevation of the winding end of the camera;

Fig. 5 is an enlarged fragmentary section through the measuring roll taken substantially on the line 5—5 of Fig. 2;

Fig. 6 is a transverse section taken substantially on the line 6—6 of Fig. 3 showing parts of the locking mechanism of the winding device in one position;

Fig. 7 is a section on the line 7—7 of Fig. 3 showing some of the parts of Fig. 6 in another position;

Fig. 8 is a view similar to Fig. 7 with the parts in still another position;

Fig. 9 is an enlarged section taken substantially on the line 9—9 of Fig. 6 but showing only the stop controller and coöperating parts;

Fig. 10 is a similar view taken substantially on the line 10—10 of Fig. 7;

Fig. 11 is an enlarged longitudinal central section through the measuring roll, with parts broken away;

Fig. 12 is a similar section complete on a much reduced scale, and

Fig. 13 is a transverse section taken substantially on the line 13—13 of Fig. 11.

Similar reference numerals throughout the several views indicate the same parts.

The roll holding camera in connection with which I have illustrated my present invention is of a familiar type comprising a body 1 with film chambers 2 and 3 at the ends thereof on opposite sides of a central exposure opening 4 across which the film strip 5 is fed intermittently from a supply spool 6 in chamber 3 to a winding spool 7 in chamber 2. A removable back 8 covers and protects the film at the rear and through the medium of this back access is gained to both of the film chambers for removing the exposed film and inserting fresh rolls. A guide roll 9 is provided at one side of the exposure chamber 4 and at the other side adjacent to the winding spool 7 this function is performed by a measuring roll 10 about which more will be said later.

Referring more particularly to Fig. 3, the winding spool 7 (Fig. 2) is turned as usual, if required, by a key 11 projecting into the slotted end thereof and manipulated by means of a thumb piece 12 on the exterior of the camera, as usual. The key is journaled within an outer plate or mount 13 and in a bushing 14 in an inner lining plate 15 of the chamber 2 in both of which it is adapted to slide longitudinally to withdraw it from the spool 7 while the latter is being inserted or removed. The retraction of the key is accomplished against the tension of the spring 16 surrounding it and bearing against a collar 17 fixed thereon. A clutch mechanism 18 mounted on the outside of plate 13 and covered by an enlargement 19 on the key prevents the latter from being turned in other than the winding direction but as this clutch is of a kind familiar to those skilled in the art, its details require no description here.

Rotatable on the bushing 14 is a drum 20 that may be turned in the direction of winding movement of the key 11 by a flexible cord 21 wound in a spiral track 22 on the periphery of the drum (Figs. 3 and 6) and passing out through an opening 23 in the casing 1 to the exterior of the camera where a button 24 at its extremity (Fig. 4) is accessible to the fingers of the operator. Pulling on the button thus rotates the drum and turns the film winding spool 7 in the winding direction by reason of the fact that a pawl 25 pivoted on the outer face of the drum and actuated by a spring 26 cooperates in this direction (Fig. 6) with a ratchet 27 fixed to the winding key 11 on the inside of plate 13. When the key is turned individually by means of the thumbpiece 12, the ratchet 27 escapes the pawl as will be seen on inspection. Likewise, a reverse movement of the drum 20 during which the cord 21 is rewound thereon, causes the pawl 25 to escape the ratchet 27 and leave the winding key 11 at rest, so that successive pulls on the cord 21 cause the key and the winding spool 7 locked therewith to travel intermittently in the one winding direction. The drum is returned and the cord 21 rewound thereon by a clock spring 28 placed under tension during the withdrawal of the cord. This spring is accommodated within a cavity 29 on the inner face of the drum 20 next adjacent to the plate 15 and one end is anchored in the latter at 29ª (Fig. 3) while the other end is anchored in the drum at 30, (Fig. 8).

The amount of film drawn onto the winding roll 7 while the latter is being driven by means of the cord 21 is automatically controlled by the passage of the film itself, that is, the winding mechanism is locked through the action of the film as soon as the exposed portion has passed from the exposure opening 4 and a fresh expanse has been stretched across the latter. To this end, the measuring roll 10, driven by the film in its passage, is utilized and when a predetermined number of revolutions of the measuring roll have measured off the proper length of film, the measuring roll causes the winding mechanism to be locked in the following manner:

Projecting to the outer side of plate 15 is a screw 31 adapted to turn with the measuring roll 10. Pivoted adjacent to the screw 31 is a pawl 32 turning on a pin 33 in the plate 15 which pin passes through a slot 34 in the pawl. The pawl is adapted to engage with a ratchet 35 fixed to the winding drum 20 in such manner as to prevent the latter from turning in the winding direction.

The pawl is normally held out of such engagement by a controller arm 36 pivoted thereto at 37 to swing laterally in a direction longitudinally of the axes of the pawl and of the measuring roll 10 and screw 31. When the controller arm, which has a knife edge 38, is at the base of the screw 31 as in Figs. 6 and 9, the feeding device, as a whole, including the winding mechanism and measuring roll, may be considered to be in "set" position. The present device is proportioned for six revolutions of the measuring roll 10 to the passage of each picture area on the film and as the measuring roll revolves, the controller arm 36 travels outwardly on the spiral track provided by the threads of the screw 31 until it has reached the position of Figs. 7 and 10. At this point, it drops into a notch 39 in the screw 31 under the influence of a spring 40 connected to the pawl 32 and locks the screw and measuring roll from turning further. Its more important function, however, is to thus allow the pawl 32 to engage the ratchet 35, as shown in Fig. 7, and lock the winding drum 20 against further winding of the film, halting the operator's outward pull on the cord 21. A second or subsequent pull on the cord 21, however, will cause the pawl 32 to shift its pivot by sliding so that the pin 33 occupies the opposite end of the slot 34, as shown in Fig. 8. This raises the controller arm 36 above the periphery of the screw 31 again and immediately a spring 41 on its pivot 37 swings the controller back to the base of the screw as shown in Fig. 9. As the pull on the cord is relieved, the pawl 32 reassumes the position of Fig. 6 and the device is ready for another winding operation by the drum 20 until there have been six more revolutions of the measuring roll 10.

There is now on the market a film prepared for the purpose of light printing desired markings on the negative through a door in the back by the use of carbon paper wound with the sensitive material and in which the picture areas are slightly longer than on the ordinary film. To enable my apparatus to handle this sort of film and, generally, to provide for feeding different lengths by means of a pull cord, I arrange for changing the diameter of the measuring roll 10 so that the film will actuate the stop member 32 for the drum 20 at a fractionally later point. To this end, the measuring roll has upon its periphery two enlargements or steps 42 and 43 (Fig. 11) with adjacent cam shoulders 44 and 45 and the surface that contacts with the film is the ribbed surface (Fig. 13) of a split sleeve 46. The normal position of this sleeve for the small diameter of the roll is shown in Fig. 11 and when it is desired to increase the diameter, the sleeve is moved longitudinally toward the right by catching the finger in a notch 47 therein. The sleeve expands and rides the cam shoulders 44 and 45 until it rests on the enlargements 42 and 43, as shown in Fig. 5. It is returned to its former position by a reverse movement.

The camera is loaded with film in the first instance, in the ordinary way and by means of the thumb-piece 12 of the key 11, the winding spool 7 being turned in this manner until the number 1 appears in the ruby window customarily provided. The first exposure having been made, the intermittent feeding of exact lengths of film is in order but at this point, the locking device comprising the pawl 32 and controller 36, may or may not be in the "set" position of Figs. 6 and 9. If in the position of Fig. 7, it could be set by a pull on the cord 21, but if the controller arm 36 is left in an intermediate position on the screw 31, the only way to carry it back to the base of the screw is to rotate the latter independently. I therefore provide for the independent regulation of the screw 31 and controller 36 so that it is not even necessary to turn the measuring roll 10 as such an operation would be apt to scratch the film lying against it.

The measuring roll 10 is tubular and is fixed to a hub 48 at one end that is journaled in a plate 49 of the casing. At the other end, it is fixed to a hub 50 that turns on a stem 51 of a clutch member 52 into which stem a shank 53 of screw 31 is secured. A countersink 54 in plate 15 permits slight endwise movement of screw 31 sufficient to disengage clutch 52 from hub 50 that constitutes the other clutch element. This longitudinal movement of clutch 52 is effected by means of a rod 55 extending axially through the measuring roll to terminate in a knurled head 56 on the exterior of the camera casing 1, as shown in Fig. 5. A head 57 at the inner end of the rod is bored to slide upon rods 58 projecting from clutch member 52 and terminating in heads 59. Outward movement of the rod 55 is limited by a stop sleeve 60 thereon while interposed between the hub 48 and the spacing sleeve 61 on the rod 55 is a spring 62 that causes the head 57 to normally abut the clutch member 52 and hold it in engagement with clutch member 50 on the measuring roll so that the latter and the screw 31 will turn together. The operating head 56 on the rod then occupies a depression or pocket 63 (Figs. 5 and 12) in which it is protected. As it is pulled out so that it is convenient to turn with the fingers against the tension of spring 62, the head 57 at its other end slides on the rods 58 and engages the heads 59 thereof, disconnecting the clutch elements 52 and 50. Rotation of the rod 55 will then not turn the measuring roll 10 but will turn the clutch member 52 through the medium of the rods 58 and hence will rotate the screw 31 independently of any other part so that the controller lever 32 may be run down to its "set" position at the base of screw 31.

A roll holder or camera provided with a winding mechanism constructed in accordance with my invention is very convenient to use and the film may be rapidly changed with little effort for successive exposures. By means of the button 24, the cord 21 is pulled until it stops and then allowed to rewind; an exposure is made; the cord is given a preliminary jerk to release the stop 32 and reset the measuring controller, and the next pull on the cord will dispose a fresh length of film in the focal plane without any observation through the ruby window or otherwise being required on the part of the operator.

I claim as my invention:

1. In a film feeding device for photographic roll holders, the combination with a film winding mechanism and means for locking the same, of a measuring roll controlling the locking means and adapted to be driven by the film and means for varying the ratio of angular movement between the measuring roll and winding mechanism through the medium of the measuring roll.

2. In a film feeding device for photographic roll holders, the combination with a film winding mechanism and means for locking the same, of a measuring roll controlling the locking means and adapted to be driven by the film and having means for increasing its diameter.

3. In a film feeding device for photographic roll holders, the combination with a film winding mechanism and means for locking the same, of a measuring roll controlling the locking means and adapted to be driven by the film, said roll embodying enlargements having cam shoulders and an expansible sleeve movable onto and off of the enlargements to increase or diminish the diameter of the roll.

4. In a film feeding device for photographic roll holders, the combination with film winding mechanism, of a film measuring roll, and means actuated thereby for locking the winding mechanism, said locking means being adapted to be regulated independently of the measuring roll.

5. In a film feeding device for photographic roll holders, the combination with film winding mechanism and a measuring roll adapted to be driven by the film, of a locking device for the winding mechanism controlled by the measuring roll and adapted to be reset by an impulse from the winding mechanism.

6. In a film feeding device for photographic roll holders, the combination with film winding mechanism, of a film measuring roll, means actuated thereby for locking the winding mechanism and a clutch connection between the locking means and the measuring roll to permit independent regulation of the former.

7. In a film feeding device for photographic roll holders, the combination with film winding mechanism, of a film measuring roll, means actuated thereby for locking the winding mechanism, a clutch connection between the locking means and the measuring roll to permit independent regulation of the former and a manually movable clutch operating member extending axially through the measuring roll.

8. In a film feeding device for photographic roll holders, the combination with film winding mechanism, of a film measuring roll, means actuated thereby for locking the winding mechanism, a clutch connection between the locking means and the measuring roll to permit independent regulation of the former and a manually movably clutch operating member extending axially through the measuring roll and also connected to the locking means to regulate it independently of the measuring roll.

9. In a film feeding device for photographic roll holders, the combination with film winding mechanism, of a film measuring roll, means actuated thereby for locking the winding mechanism, a clutch connection between the locking means and the measuring roll to permit independent regulation of the former and a common manually movable operating member for the clutch and for the independent regulation of the locking means.

10. In a film feeding device for photographic roll holders, the combination with film winding mechanism and a measuring roll adapted to be driven by the film, of a locking device for the winding mechanism comprising a stop, a controller normally holding it in inoperative position, and a member actuated by the measuring roll coöperating with the controller to release the same after a predetermined movement of the measuring roll.

11. In a film feeding device for photographic roll holders, the combination with film winding mechanism and a measuring roll adapted to be driven by the film, of a locking device for the winding mechanism comprising a stop, a controller normally holding it in inoperative position, a member actuated by the measuring roll coöperating with the controller to release the same after a predetermined movement of the measuring roll, and means for resetting the controller relatively to said member by an impulse from the winding mechanism.

12. In a film feeding device for photographic roll holders, the combination with film winding mechanism and a measuring roll adapted to be driven by the film, of a locking device for the winding mechanism comprising a ratchet and pawl, a controller for the pawl normally holding it in inoperative position and a rotary member driven by the measuring roll and having a spiral track with which the controller coöperates and off of which it is adapted to ride to release the pawl after a predetermined movement of the measuring roll.

WILLIAM BAUSCH.

Witnesses:
WILLIAM G. WOODWORTH,
WILLIAM V. KEIL.